(12) United States Patent
Doerr et al.

(10) Patent No.: US 6,385,373 B1
(45) Date of Patent: May 7, 2002

(54) COMPENSATED CASCADED WAVEGUIDES

(75) Inventors: Christopher Richard Doerr, Middletown; Corrado Pietro Dragone, Little Silver, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/490,610

(22) Filed: Jan. 25, 2000

Related U.S. Application Data

(60) Provisional application No. 60/162,583, filed on Oct. 29, 1999.

(51) Int. Cl.[7] .............................. G02B 6/26; G02B 6/32
(52) U.S. Cl. .............................. 385/46; 385/33; 385/37; 385/50; 359/130; 359/131
(58) Field of Search ........................ 385/24, 37, 31–34, 385/46–48, 50; 359/124, 127, 128, 130, 131

(56) References Cited

U.S. PATENT DOCUMENTS

| | | | |
|---|---|---|---|
| 4,786,131 A | * | 11/1988 | Mahapatra et al. |
| 4,904,042 A | | 2/1990 | Dragone |
| 5,002,350 A | | 3/1991 | Dragone |
| 5,136,671 A | | 8/1992 | Dragone |
| 5,179,605 A | * | 1/1993 | Kaverhad et al. ............ 385/37 |
| 5,208,885 A | | 5/1993 | Dragone |
| 5,889,906 A | * | 3/1999 | Chen ........................... 385/28 |
| 6,181,849 B1 | * | 1/2001 | Lin et al. ..................... 385/24 |
| 6,259,833 B1 | * | 7/2001 | Doerr et al. ................. 385/17 |

OTHER PUBLICATIONS

C. Dragone, "Optimum design of a planar array of tapered waveguides", J. Opt. Soc. Am., vol. 7, No. 11/Nov. 1990, pp. 2081–2093.

C. Dragone, "An NxN Optical Multiplexer Using a Planar Arrangement of Two Star Couplers", IEEE Photonics Technology Letters, vol. 3, No. 9, Sep. 1991, pp. 812–814.

* cited by examiner

*Primary Examiner*—Hemang Sanghavi
(74) *Attorney, Agent, or Firm*—Howard R. Popper

(57) ABSTRACT

When two star couplers are cascaded so as to perform two Fourier transformations without phase distortions, an imaging arrangement results which accurately reproduces at the output the input distribution. In order to achieve high efficiency of power transfer between a relatively large number of input ports and a relatively large number of output ports and a small star-coupler physical size, the input and output waveguides connected to the star coupler must be relatively narrow and be closely spaced at the star coupler. However close spacing gives rise to significant mutual coupling between adjacent waveguides, leading to undesirable crosstalk between the channels of the device. We have discovered that the phase distortion is approximately periodic and may be compensated for by adding or subtracting length to the waveguides between the star couplers. The path length correction is essentially a sinusoid with the minimum increase in required path length being applicable to the ports at the centers of the star-coupler Brillouin zones and the maximum increase in required length being applicable to the ports at the edges of the star-coupler Brillouin zones.

6 Claims, 2 Drawing Sheets

COMPENSATED CASCADED WAVEGUIDES

This application claims the benefit of Provisional Application No. 60/162,583 filed Oct. 29, 1999.

FIELD OF THE INVENTION

This invention relates to cascaded optical waveguides and, more particularly, to mutually coupled waveguide arrays.

BACKGROUND OF THE INVENTION

The star coupler, which divides the power entering over any of its input ports among its output ports, is used to interconnect waveguide arrays. Different messages can be communicated among the various subscribers by using wavelength, or time division multiplexing. C. Dragone in U.S. Pat. No. 4,904,042 issued to the assignee of the present application, teaches that, especially for single mode waveguides, the star coupler's input and output waveguides should be arranged in circular arrays and that the center of curvature of the arc segment of the input array should lie on the arc segment of the output array, and vice versa. Also, the axes of the waveguides in each array should be directed to the center of curvature of the arc defining the configuration of that array and the radius of the circles defining the configuration of each array should be chosen to maximize the transmission from the marginal input elements to the marginal output elements. The aperture of each of the elements may be further varied from element to element to maximize the efficiency of the array. The coupler is typically designed so that the optical radiation entering the coupler is confined, by fabricating layers of appropriately doped silica, to a two-dimensional silica slab of low loss material. Power transfer between the input and output ports of the coupler takes place in a free space region defined by a slab waveguide between two arrays of waveguides. Power entering any of the waveguides excites the dominant mode of the waveguide, is radiated in the coupler region and is intercepted by the receiving array aperture.

In order to achieve high efficiency of power transfer between a relatively large number of input ports and a relatively large number of output ports and a small star-coupler physical size, the input and output waveguides connected to the star coupler must be relatively narrow and be closely spaced at the star coupler. However close spacing gives rise to significant mutual coupling between adjacent waveguides, leading to undesirable crosstalk between the channels of the device. C. Dragone in U.S. Pat. No. 5,136,671 has shown that by locating the foci of the respective input and output arrays at a predetermined distance away from and outside the free space region (e.g., of the slab) and appropriately adjusting the star-coupler waveguide lengths to minimize residual aberrations, phase errors and cross-talk caused by mutual coupling between the waveguides may be minimized. Specifically, the focal point of each array should be located so that it coincides with the phase center of the other array and that residual phase errors may be reduced by appropriately setting the lengths of the waveguides in the optical grating between two star couplers. See also the article entitled "Optimum Design of a Planar Array of Tapered Waveguides", J. Opt. Soc. Am. A. vol. 7, pp 2081–2093, 1990.

While moving the convergence points of the waveguides off the free space boundaries and into the waveguide array partially compensates for the mutual coupling phase distortion, this physical distortion of the star coupler generally results in the star coupler no longer acting as a discrete Fourier transformer. Thus, to preserve the Fourier transform functionality of the star coupler and its benefits, such as facilitating the design process and speeding and simplifying the design simulation, one should keep the conventional coupler geometry in which the convergence point of each array falls on the termination point of the center waveguide of the next array. Instead one should adjust the waveguide lengths. Note, that for very strong mutual coupling, where the field changes significantly over angle changes on the order of $\sqrt{2/kR}$, star coupler physical distortions can no longer be avoided.

Consider, for instance, a waveguide router, consisting of a waveguide grating placed between two arrays. In this case the grating is effectively located in the far field of either array. Mutual coupling that gives rise to phase distortion also distorts the transmission coefficients of the router. It would be extremely advantageous, especially in waveguides used in interferometric devices, such as waveguide grating routers and waveguide lenses, to compensate for mutual coupling phase distortion without having to change coupler geometry.

SUMMARY OF THE INVENTION

When a lightwave is sent into a single port on one side of a star coupler, the lightwaves that appear in the ports on the other side will not have the same phase if there is mutual coupling among the waveguides. Such mutual coupling arises among the waveguides where they are closely spaced near the free space region at the edges of the slab. We have discovered that the phase distortion is approximately periodic and may be compensated for by adding or subtracting length to the waveguides between the star couplers. The path length correction is essentially a sinusoid with the minimum increase in required path length being applicable to the ports at the centers of the star-coupler Brillouin zones and the maximum increase in required length being applicable to the ports at the edges of the star-coupler Brillouin zones. The magnitude of the sinusoid can be found by numerical beam propagation in the waveguide array. The angular period of the distortion is given by $\lambda/a$, where $\lambda$ is the free-space region wavelength and a is the center to center waveguide spacing at the edge of the free space region. We have also discovered that by eliminating phase distortions, a star coupler accurately performs a proper Fourier transformation so that when two star couplers are cascaded so as to perform two Fourier transformations without phase distortions, an imaging arrangement results which accurately reproduces at the output the input distribution.

BRIEF DESCRIPTION OF THE DRAWING

The foregoing and other features of the invention may become more apparent from a reading of the ensuing general description, together with the drawing, in which.

GENERAL DESCRIPTION

In the ensuing discussion certain symbols will be used. For convenience they are tabulated below.

$\kappa$ is the propagation constant of the free-space region,
$\beta$ is the propagation constant of the waveguides,
$\lambda$ is the wavelength,
a is the waveguide spacing at the connection to the free-space region.
$\gamma$ is the propagation constant of the evanescent fields,
L is the waveguide path length,
R is the radius of the free space region,
w is the waveguide width, and
z is the propagation distance.

Figure 2A:
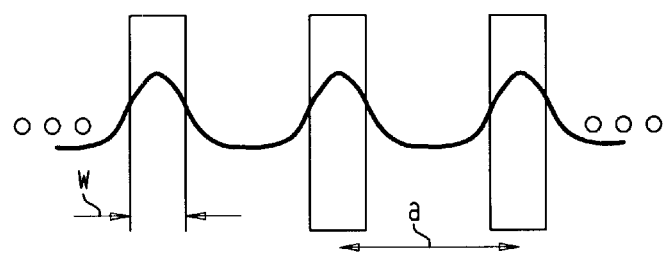
FIGS. 2a and 2b show the slower and faster modes of an infinite array used in calculating mutual coupling.
Figure 2B:
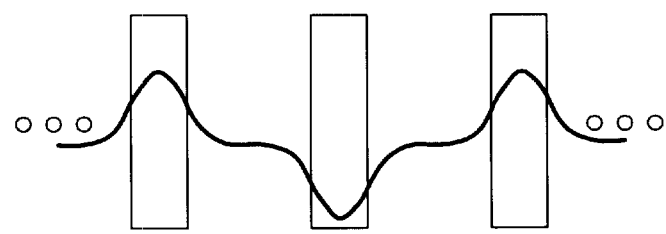

In free space, e.g., with no waveguide, the forward propagation constant is different for each of the possible modes (plane waves). Having different propagation constants means that a mode that is not an eigenmode of the structure will change with propagation. In the star coupler, the input and output waveguides are terminated on an arc of a quasi-free-space slab whose center of curvature is the convergence point of the waveguides' axes. The amount of mutual coupling among the waveguides depends on the difference in propagation constants between the guided modes of the structure. To determine the order of magnitude of the mutual coupling therefore involves computing the propagation constant difference between the slowest (largest propagation constant) and fastest guided local normal modes (there is an infinite number of guided modes), as shown in FIG. 2. By matching boundary conditions (i.e., the field and derivative of the field must be continuous at a dielectric boundary) for the transverse electric (TE) mode (or, in a particular embodiment, the quasi-transverse magnetic (TM) mode), we find the dispersion relations for the slow and fast modes:

$$\kappa_{slow}\tan(\kappa_{slow}w/2) = \gamma\frac{1-\exp[\gamma_{slow}(w-a)]}{1+\exp[\gamma_{slow}(w-a)]} \quad \text{and} \quad (1)$$

$$\kappa_{fast}\tan(\kappa_{fast}w/2) = \gamma 1 + \frac{\exp[\gamma_{fast}(w-a)]}{1-\exp[\gamma_{fast}(w-a)]}$$

respectively, where $$\kappa = \sqrt{n_{core}^2 k^2 - \beta^2} \quad \text{and} \quad \gamma = \sqrt{\beta^2 - n_{clad}^2 k^2}.$$

Inserting the equations for $\kappa$ and $\gamma$ into (1), letting $\beta_{slow}=\beta_{fast}+\Delta\beta$, by performing a small signal approximation and by applying the constraint that waveguide separation is large enough so that $\exp[\gamma(w-a)]<<1$, we find that the difference in propagation constants between the slowest and fastest mode waveguides is:

$$\Delta\beta = \frac{4\kappa^2\gamma^2\exp(\gamma w)}{\beta[\kappa^2+\gamma^2+w(\kappa^2\gamma+\gamma^3)/2]}\exp(-\gamma a) \equiv c\exp(-\gamma a) \quad (2)$$

Suppose we start with light in every other waveguide of the array. The mode that has a lightwave in every waveguide is a sum of the slow and fast modes. When the phase accumulation between the propagation constants $$\phi = \int_{z_0}^{\infty} \Delta\beta dz \quad (3)$$

reaches $\pi$, the light will have shifted to the other set of every other waveguide. We want to know the distance $z_0$ at which the coupling is <25 dB in power of the complete transfer. Since the transfer is sinusoidal, we want $\phi<0.11$. Substituting Eq. (2) into Eq. (3), we find $$z_0 < \ln\left(\frac{c}{0.11\gamma\alpha}\right)\frac{1}{\gamma\alpha} \quad (4)$$

where $\alpha$ is the angle between neighboring waveguides.

From Eq. (4), we learn the important fact that the mutual coupling between waveguides in an array diverging at an angle is finite. Thus, once the waveguides are extended to a separation of a $>az_0$, they can be bent, phase-shifted, continued, etc, with negligible effect on the star coupler. We thus call the entire region of length $L=2z_0-R$ the star coupler.

$$R = \frac{a_{s_1}a_{s_2}nM}{\lambda} \quad (5)$$

is the free-space radius, and $a_{si}$ is the center-to-center inlet spacing at the edges of the free-space region on side i. Taking the symmetric case of $a_{s1}=a_{s2}\equiv a_s$, $$L = \frac{a_s nM}{\lambda}\left[\frac{2}{\gamma}\ln\left(\frac{ca_s nM}{0.11\gamma\lambda}\right)-a_s\right] \quad (6)$$

Figure 3A:
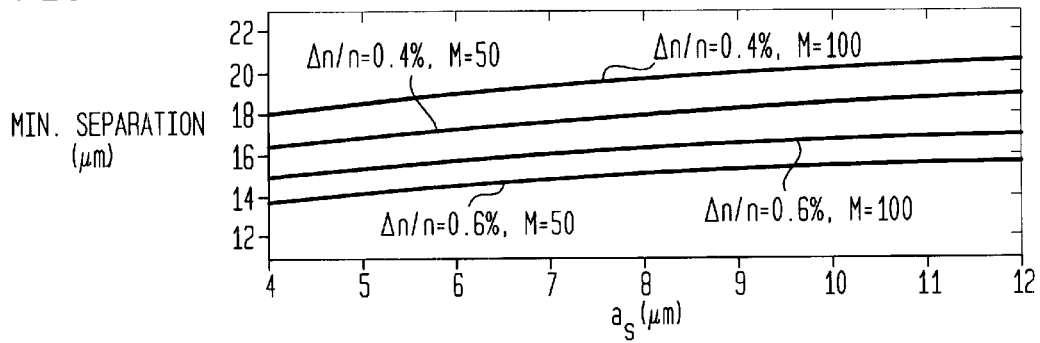
FIGS. 3a and 3b, respectively, show plots of minimum waveguide separation and minimum star coupler length vs. the center-to-center waveguide spacing at the free-space boundary.
Figure 3B:
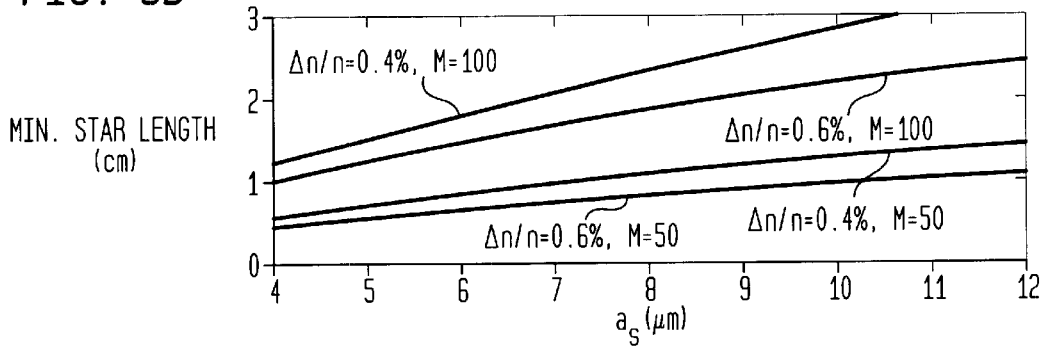

Shown in FIG. 3 are plots of $az_0$ and L vs. $a_s$ for a typical cases in silica of $(n_{core}-n_{clad})/n=0.004$ and 0.006, n=1.45, w=6 $\mu$m, and M=50 and 100. As one can see, increasing the mutual coupling, i.e., decreasing $a_s$, allows one to significantly decrease the star coupler physical size, and thus that of the entire device.

It is important to realize that $z_0$ is relatively insensitive to the width of the waveguides, w. Instead, it is the waveguide center-to-center spacing, a, and the index step, $n_{core}-n_{cladding}$, to which the mutual coupling is substantially more sensitive.

Figure 1:
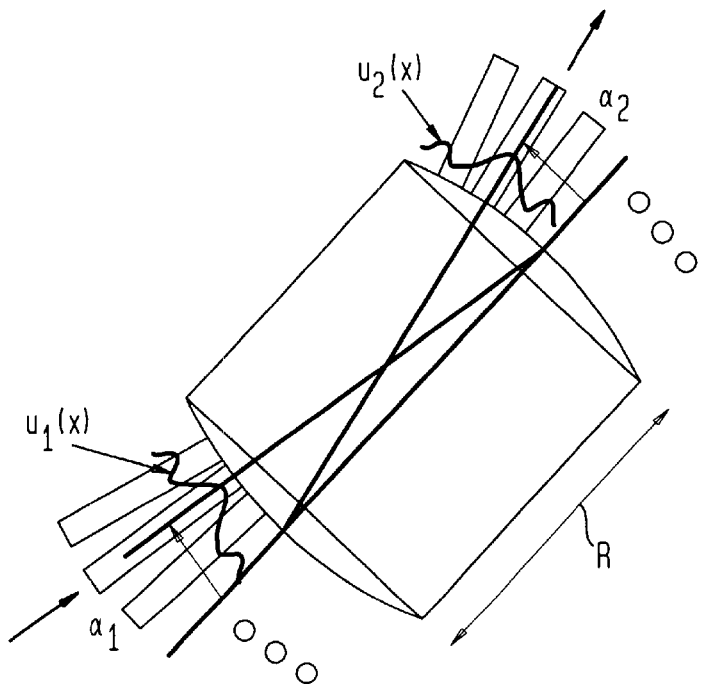
FIG. 1 shows a star coupler.

Phase Correction Due to Mutual Coupling:

It can readily be shown that the transmissivity from one waveguide at angle $\alpha_1$ on one side of the star coupler to one at angle $\alpha_2$ on the other side is:

$$t_{star}(\alpha_1, \alpha_2) = \quad (7)$$

$$\exp(-jnkR\alpha_1\alpha_2)\int_{-\infty}^{\infty}\frac{u_2(x)\exp(jnkx\alpha_1)dx\int_{-\infty}^{\infty}u_1(x)\exp(jnkx\alpha_2)dx}{\sqrt{\frac{2\pi R}{nk}\int_{-\infty}^{\infty}|u_1(x)|^2 dx\int_{-\infty}^{\infty}|u_2(x)|^2 dx}}$$

where $u_i$ is the field amplitude at the edge of the free-space region on side i, found by exciting only one waveguide in the array far enough away when the waveguides are decoupled, propagating it, via beam propagation, to the star coupler edge, (see FIG. 1).

If the input to each port on one side of the star coupler has complex amplitude $s_1(m_1)$, then the output from each port $s_2(m_2)$ on the other side is, from Eq. (7), $$\frac{s_2(m_2)}{f(m_2)} = \sum_{m_1=1}^{M_1} \exp(j2\pi m_1 m_2/M) f(m_1) s_1(m_1) \qquad (8)$$

where $f$ is a function linear in its argument. Thus, the star coupler takes a discrete Fourier transform going from s1 to s2. Changing the star coupler physical layout to correct for the mutual-coupling induced aberrations, rather than just changing the waveguide lengths, generally destroys this Fourier transform property (provided the mutual coupling is not extremely strong, as mentioned earlier).

If the waveguides on both sides are spaced in angle by $\lambda/(a_{si}nM)$ (where the $a_{si}$ is for the opposite side of the one at which we are measuring the angle), then as the mutual coupling increases, $|t_{star}|$ approaches $1/\sqrt{M}$ for $-\lambda/(2a_s n)<\alpha_1$, $\alpha_2<\lambda/2(a_s n)$ (i.e., the central Brillouin zone of each side) and 0 otherwise. $\angle t_{star}$ is a linear plus periodic function in angle with a period of $\lambda/a_s n$.

The periodicity of $\angle t_{star}$ can be understood from the following. From Eq. (7), one can see that $t_{star}$ from one waveguide on the left side of the coupler to all of the ones on the right is a constant multiplied by the amplitude of the plane wave component of the field on the left that is propagating in the same direction that the particular right-side waveguide is pointing. Analogous to plane waves in free space, in a periodic array of waveguides the field can be written as a sum of Bloch modes traveling in different directions (in Sec. 2, the slow mode we found is the Bloch mode traveling straight ahead). When the mode starts where the waveguides are decoupled, all of the Bloch modes are in phase. During mutual coupling, the Bloch modes have different propagation constants (as we saw in Sec. 1), and thus the Bloch modes acquire different phases. At the free-space region border, each Bloch mode converts to a plane wave pointing in the same direction. However all the Bloch modes traveling at angles $\theta+m\lambda/(an)$, where m is an integer, are identical. Thus if we look at just the Bloch modes within the central Brillouin zone, each Bloch mode couples to multiple plane waves spaced in angle by $\lambda/(an)$ (couples to only one plane wave for infinite mutual coupling). The phase of the coupling is necessarily the same for the first few coupled plane waves from the center (because the plane wave amplitudes are given by the Fourier transform of the periodic mode of the waveguide array), but the magnitude is not. This is why $t_{star}$ is approximately periodic in phase but not in magnitude.

Figure 4A:
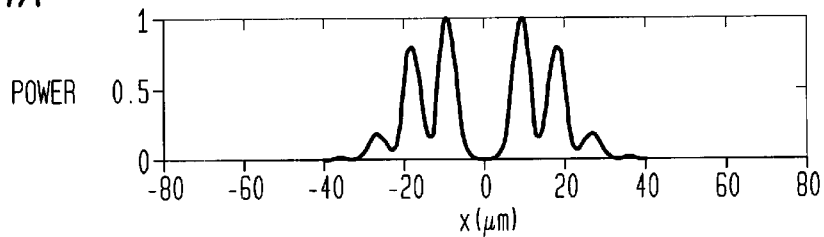
FIGS. 4a, 4b and 4c, respectively, show the calculated field power, magnitude and phase of t star for a somewhat strongly mutually coupled star coupler as determined by beam propagation.
Figure 4B:
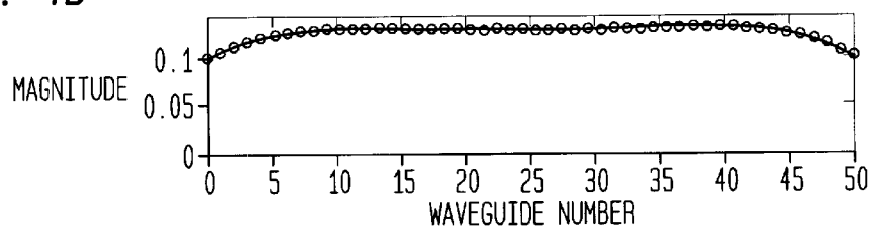
Figure 4C:
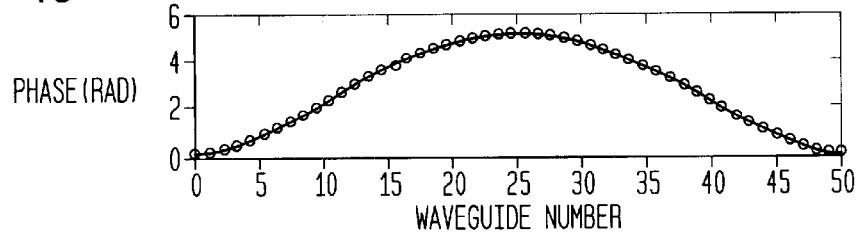

Interestingly, from the above discussion, we can predict what the field u(x) looks like at the edge of the free-space region in a strongly coupled array. It must have approximately the form $$\frac{\sin(\pi x/a)}{\pi x/a} \otimes F\{\exp[j\phi(\alpha)]\} \qquad (8)$$

where $\phi$ is some periodic function in $\alpha$. For example, if $\phi$ is sinusoidal, the Fourier transform is a series of impulses spaced by $a_{si}$ with Bessel function amplitudes. The resultant field is series of peaks centered on the inlets with seemingly random amplitudes. FIG. 4 shows u, $|t_{star}|$, and $\angle t_{star}$ for a somewhat strongly mutually coupled star coupler as calculated by beam propagation and Eq. (7).

This phase distortion caused by the mutual coupling needs to be compensated. For small amounts of mutual coupling, the periodic phase profile due to the mutual coupling can be approximated by a parabolic phase profile. So, as suggested by Dragone in the above-mentioned patent, one can partially compensate for the mutual coupling phase distortion by changing the star coupler geometry (i.e. by moving the convergence points of the waveguides off the free-space boundaries and into the waveguide array). However, as mentioned above, the star coupler no longer takes a pure discrete Fourier transform, leading to difficulties such as a complicated design process and simulation. Thus, provided the mutual coupling is not extremely strong, one should keep the conventional star coupler geometry (in which the convergence point of each array falls on the termination point of the center waveguide of the next array) and instead appropriately adjust the path lengths of the adjacent waveguide arrays.

Conclusion

It is often desirable to maximize the efficiency of a waveguide array by using closely spaced waveguides at the interface between the array and the free-space body on which the array terminates. Phase aberration can be corrected by properly choosing the optical path lengths of the waveguides. For example, for a waveguide grating situated between two star couplers, one should properly adjust the lengths of the arms of the grating or include in the arms of the grating suitable length corrections, chosen so as to produce a good phase match between two waves, produced in opposite directions by exciting a particular pair of waveguides located on opposite sides of the grating. That is, the corrections must include two components, correcting respectively the input and output aberrations. Notice that the aberrations arising in the two cases are entirely similar, as one can verify by reversing the sense of transmission and invoking reciprocity.

What is claimed is:

1. An optical arrangement, comprising an optical body defining a free-space region, a first waveguide array forming a lens on one side of said body, and a second waveguide array forming a lens on another side of said body, said waveguides being closely spaced, CHARACTERIZED in that said waveguides of said second waveguide array have quasi-periodic lengths to compensate for phase distortion due to mutual coupling occasioned by said close spacing among the waveguides of said first array.

2. A method of compensating an optical arrangement having a plurality of waveguide paths between ports of star couplers exhibiting Brillouin zones, said paths exhibiting mutual coupling, comprising the steps of adding or subtracting a length correction to said waveguide paths; said length correction being essentially a sinusoidal function providing a minimum increase in correction path length applicable to ports at the centers of said Brillouin zones and a maximum increase in path length applicable to ports at the edges of said Brillouin zones.

3. An arrangement comprising a pair of cascaded star couplers connected by a plurality of waveguide paths, an input star coupler of said pair being adapted to perform a Fourier transformation on an input signal and an output star coupler of said pair being adapted to perform an inverse Fourier transform, characterized in that the lengths of said waveguides paths between said pair of couplers are adjusted according to a quasi-periodic function to reduce phase distortion produced by mutual coupling between said paths so that a signal distribution appears at said output star coupler which is essentially the same as is applied at said input star coupler.

4. An arrangement according to claim 3, wherein said star couplers exhibit Brillouin zones at ports and wherein said periodic function adjusts the lengths of the waveguides between the star couplers substantially sinusoidally from a minimum path length at ports at the centers of the star-coupler Brillouin zones to a maximum path length at ports at the edges of the star-coupler Brillouin zones.

5. An optical arrangement for imaging an input signal at an output, comprising an optical body defining a free-space region, an input waveguide array for coupling said input signal to said optical body;

an output waveguide array coupled to said optical body, said waveguide arrays exhibiting a plurality of path lengths from input to output, at least two waveguides of said arrays being closely spaced and mutually coupled; said waveguide arrays being positioned on said optical body to provide an imaging lens profile compensated by the lengths of the several waveguides being adjusted to reduce phase distortion occasioned by said mutual coupling.

6. An arrangement according to claim 5 wherein said lens profile is in the far-field of either of said waveguides.

* * * * *